United States Patent
Konishi

(10) Patent No.: US 9,592,810 B2
(45) Date of Patent: Mar. 14, 2017

(54) BRAKE CONTROL DEVICE, AND BRAKE CONTROL METHOD

(71) Applicant: Kazuki Konishi, Tokyo (JP)

(72) Inventor: Kazuki Konishi, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 14/766,009

(22) PCT Filed: Feb. 19, 2013

(86) PCT No.: PCT/JP2013/053913
§ 371 (c)(1),
(2) Date: Aug. 5, 2015

(87) PCT Pub. No.: WO2014/128820
PCT Pub. Date: Aug. 28, 2014

(65) Prior Publication Data
US 2016/0001756 A1    Jan. 7, 2016

(51) Int. Cl.
*B60T 13/66* (2006.01)
*B60L 15/20* (2006.01)
(Continued)

(52) U.S. Cl.
CPC ............ *B60T 13/665* (2013.01); *B60L 3/003* (2013.01); *B60L 3/0061* (2013.01); *B60L 7/26* (2013.01);
(Continued)

(58) Field of Classification Search
CPC .... B60L 2200/26; B60L 3/003; B60L 3/0061; B60L 7/26; B60L 2220/42;
(Continued)

(56) References Cited

U.S. PATENT DOCUMENTS

| 4,659,149 A | 4/1987 | Rumsey |
| 5,547,264 A * | 8/1996 | Tozu .................... B60T 8/1764 303/113.5 |

(Continued)

FOREIGN PATENT DOCUMENTS

| DE | 102006011963 B3 | 8/2007 |
| EP | 0152300 A2 | 8/1985 |

(Continued)

OTHER PUBLICATIONS

International Search Report (PCT/ISA/210) mailed on Apr. 16, 2013, by the Japanese Patent Office as the International Searching Authority for International Application No. PCT/JP2013/053913.

(Continued)

*Primary Examiner* — Atul Trivedi
(74) *Attorney, Agent, or Firm* — Buchanan Ingersoll & Rooney PC

(57) ABSTRACT

A required brake force calculator calculates a required brake force for each vehicle based on a load on the vehicle or carriage detected by a variable load detector and a brake command acquired by a command acquirer. A target brake force calculator, based on the required brake force, calculates a common target brake force for a vehicle driven by a main electric motor and calculates a common target brake force for a vehicle not driven by a main electric motor. A control pattern generator, based on the target brake force and a vehicle speed detected by a speed detector, generates a common control pattern for electric power converters. An electric brake force calculator calculates an electric brake force generated by operation of main electric motors. A supplementer sends a brake force command value based on the electric brake force and the target brake force to mechanical brakes.

6 Claims, 6 Drawing Sheets

(51) Int. Cl.
*B60T 8/18* (2006.01)
*B60L 7/26* (2006.01)
*B60T 17/22* (2006.01)
*B60L 3/00* (2006.01)
*B60L 15/38* (2006.01)
*B60T 8/17* (2006.01)

(52) U.S. Cl.
CPC ........... *B60L 15/2009* (2013.01); *B60L 15/38* (2013.01); *B60T 8/1705* (2013.01); *B60T 8/1893* (2013.01); *B60T 17/228* (2013.01); B60L 2200/26 (2013.01); B60L 2220/42 (2013.01); B60L 2240/12 (2013.01); B60L 2240/423 (2013.01); B60L 2240/429 (2013.01); B60L 2240/529 (2013.01); Y02T 10/648 (2013.01); Y02T 10/72 (2013.01); Y02T 10/7275 (2013.01)

(58) Field of Classification Search
CPC ........... B60L 2240/12; B60L 2240/423; B60L 2240/429; B60L 2240/529; B60L 15/2009; B60L 15/38; Y02T 10/648; Y02T 10/72; Y02T 10/7275; B60T 13/665; B60T 17/228; B60T 8/1893
USPC ............................................................ 701/19
See application file for complete search history.

(56) References Cited

U.S. PATENT DOCUMENTS

| | | | | |
|---|---|---|---|---|
| 5,549,364 | A * | 8/1996 | Mayr-Frohlich | B60T 8/1708 303/123 |
| 5,713,639 | A | 2/1998 | Doto et al. | |
| 5,938,299 | A * | 8/1999 | Hara | B60T 8/1766 303/113.5 |
| 9,090,232 | B2 * | 7/2015 | Onoda | B60L 7/08 |
| 2002/0180266 | A1 * | 12/2002 | Hara | B60L 3/108 303/152 |
| 2008/0255744 | A1 * | 10/2008 | Yasui | B60T 8/1755 701/70 |
| 2009/0069149 | A1 * | 3/2009 | Okumura | B60L 7/10 477/28 |
| 2010/0174463 | A1 * | 7/2010 | Uragami | B60T 8/1755 701/70 |
| 2011/0272230 | A1 * | 11/2011 | Sekiya | B60T 1/10 188/70 R |
| 2012/0139330 | A1 * | 6/2012 | Morishita | B60T 1/10 303/3 |
| 2013/0173127 | A1 * | 7/2013 | Nakatsu | B60L 3/102 701/70 |
| 2015/0061361 | A1 * | 3/2015 | Maruo | B60T 11/224 303/10 |
| 2015/0112568 | A1 * | 4/2015 | Hirota | B60T 8/1755 701/72 |
| 2015/0175140 | A1 * | 6/2015 | Shimizu | B60T 8/171 701/70 |
| 2015/0224978 | A1 * | 8/2015 | Shimizu | B60T 8/172 701/70 |
| 2015/0239448 | A1 * | 8/2015 | O'Meachair | B60T 8/172 701/70 |
| 2016/0137068 | A1 * | 5/2016 | Nada | B60L 7/26 701/70 |

FOREIGN PATENT DOCUMENTS

| | | |
|---|---|---|
| JP | 56-110404 A | 9/1981 |
| JP | 63-035103 A | 2/1988 |
| JP | 04-133603 A | 5/1992 |
| JP | 05-056507 A | 3/1993 |
| JP | 08-301099 A | 11/1996 |
| JP | 08-331703 A | 12/1996 |
| JP | 2003-102103 A | 4/2003 |
| WO | 2004/054840 A1 | 7/2004 |

OTHER PUBLICATIONS

Written Opinion (PCT/ISA/237) mailed on Apr. 16, 2013, by the Japanese Patent Office as the International Searching Authority for International Application No. PCT/JP2013/053913.

Extended European Search Report issued by the EPO on Nov. 2, 2016 in corresponding European Application No. 13875662.2 (9 pages).

* cited by examiner

BRAKE CONTROL DEVICE, AND BRAKE CONTROL METHOD

TECHNICAL FIELD

The present disclosure relates to a brake control device and a brake control method for a moving vehicle provided with a main electric motor that drives wheel rotation.

BACKGROUND ART

Brakes for electric railway cars (hereinafter referred to as electric cars) include electric brakes, which obtain brake force by causing an electric motor to operate as an electric generator, and mechanical brakes, which obtain brake force due to friction generated by using air pressure or hydraulic pressure to push a brake shoe against the tread of the wheel, or push a pad against a brake disc. Control devices for electric cars that implement both electric brakes and mechanical brakes are being used in practical applications.

In a control device for an electric car that implements both electric brakes and mechanical brakes, a required brake force for a vehicle is computed based on the load on the vehicle and a brake command given from the driver's cab or the like, and the electric brakes operate within a range determined by a limit value of the overhead line voltage, for example. When the brake force of the electric brakes is less than the required brake force, the brake force is supplemented by the mechanical brakes. This is called air supplement control.

As the overhead line voltage rises, changes in the overhead line voltage limit occur frequently. For this reason, the electric car control device disclosed in Patent Literature 1 decreases fluctuations in the air supplement control due to changes in the overhead line voltage limit, and minimizes fluctuations in the wear loss of the brake shoes.

CITATION LIST

Patent Literature

Patent Literature 1: Unexamined Japanese Patent Application Kokai Publication No. H8-331703

SUMMARY OF INVENTION

Technical Problem

Besides the case of a high overhead line voltage, when the load on each vehicle differs, and the output of each electric brake on a motor coach is the same, the motor coach being a vehicle provided with the electric motor, the air supplement control amount for the vehicles with a large load becomes large compared to the air supplement control amount for the vehicles with a small load, the wear loss of the brake shoes differs among the vehicles, and the replacement cycles of the brake shoes deviate from each other.

The present disclosure has been devised in light of the above circumstances, and takes as an objective thereof to decrease fluctuations in the wear loss of mechanical brakes in an electric car that implements both electric brakes and mechanical brakes.

Solution to Problem

To achieve the above objective, a brake control device according to the present disclosure is provided with an electric power converter, a variable load detector, a command acquirer, a speed detector, a required brake force calculator, a target brake force calculator, a control pattern generator, an electric brake force calculator, and a supplementer. The electric power converter controls a main electric motor that induces wheel rotation. The variable load detector detects a load on a vehicle or a carriage attached to the vehicle. The command acquirer acquires a brake command that includes a deceleration of the vehicle. The speed detector detects the speed of the vehicle. The required brake force calculator calculates the required brake force for each vehicle or carriage, based on the load on the vehicle or carriage and the brake command. Based on the required brake force calculated for each vehicle or carriage, the target brake force calculator calculates a target brake force that is common for each vehicle or carriage driven by a main electric motor, and calculates a target brake force that is common for each vehicle or carriage not driven by the main electric motor. The control pattern generator generates a common control pattern for use in control of the main electric motor, based on the target brake force and the speed of the vehicle. The electric brake force calculator calculates an electric brake force generated by operation of the main electric motor controlled according to the control pattern. The supplementer calculates a brake force command value based on the electric brake force and the target brake force, and sends the brake force command value to a mechanical brake that inhibits wheel rotation.

Advantageous Effects of Invention

According to the present disclosure, it becomes possible to decrease fluctuations in the wear loss of mechanical brakes in an electric car that implements both electric brakes and mechanical brakes.

DESCRIPTION OF EMBODIMENTS

Figure 1:
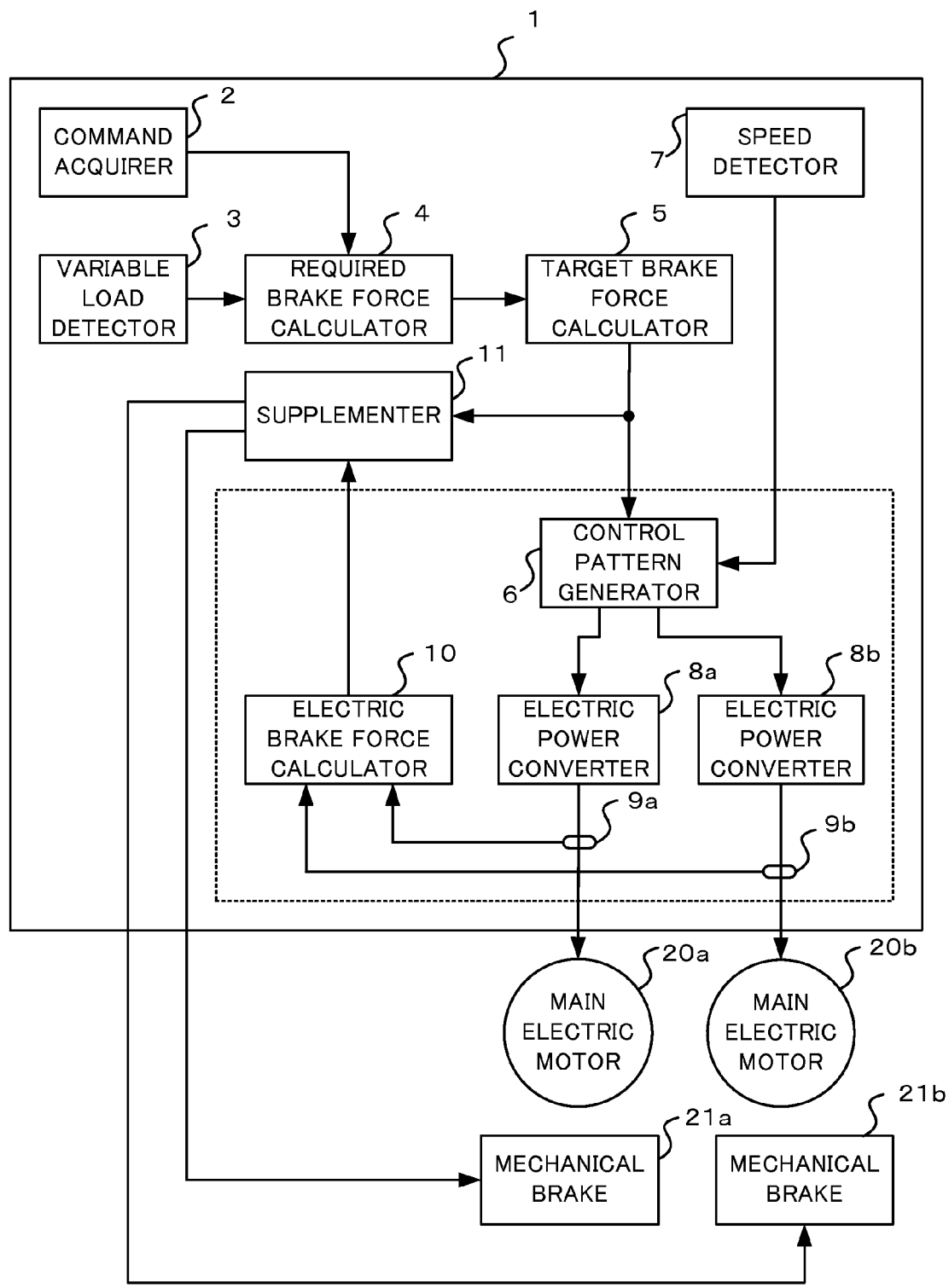
FIG. 1 is a block diagram illustrating an example configuration of a brake control device according to an embodiment of the present disclosure.

Hereinafter, exemplary embodiments of the present disclosure will be described in detail and with reference to the drawings. Note that in the drawings, the same signs are given to the same or similar parts.

FIG. 1 is a block diagram illustrating an example configuration of a brake control device according to an embodiment of the present disclosure. The brake control device 1 is provided with a command acquirer 2, a variable load detector 3, a required brake force calculator 4, a target brake force calculator 5, a control pattern generator 6, a speed detector 7, electric power converters 8a and 8b, current detectors 9a and 9b, an electric brake force calculator 10, and a supplementer 11. The part enclosed by the dashed line in FIG. 1, including the control pattern generator 6, the electric power converters 8a and 8b, the current detectors 9a and 9b, and the electric brake force calculator 10, is a propulsion control device.

As a result of the electric power converters 8a and 8b controlling main electric motors 20a and 20b, and the supplementer 11 sending a brake force command value to mechanical brakes 21a and 21b, the brake control device 1 controls braking of an electric railway car (hereinafter referred to as an electric car). The electric power converters 8a and 8b control an arbitrary number of main electric motors, and may control two or more main electric motors. Also, the number of electric power converters is not limited to two, and an arbitrary value equal to or greater than two is acceptable. For the sake of simplicity, in the example of FIG. 1, the electric power converter 8a is configured to control the main electric motor 20a, while the electric power converter 8b is configured to control the main electric motor 20b.

The command acquirer 2 acquires a brake command, and sends the brake command to the required brake force calculator 4. The command acquirer 2, for example, receives the input of a brake operation conducted by a driver in the driver's cab, and sends a brake command including a deceleration of the vehicle corresponding to the brake operation to the required brake force calculator 4. The variable load detector 3 detects the load on a vehicle, or a carriage attached to a vehicle, that constitutes the electric car, and sends the detected load to the required brake force calculator 4. The variable load detector 3 detects the load on the vehicle or carriage based on a variable load signal emitted from an air spring supporting the carriage of the vehicle. The variable load signal indicates a pressure change corresponding to the load on the spring. The load includes the weight of passengers or freight in addition to the weight of the vehicle itself.

Based on the load on the vehicle or carriage and the brake command, the required brake force calculator 4 calculates, for each vehicle or carriage, a required brake force that is the force required to generate the vehicle deceleration included in the brake command with respect to the mass of the vehicle. The required brake force calculator 4 sends the calculated required brake force to the target brake force calculator 5. As discussed later, based on the required brake force calculated for each vehicle or carriage, the target brake force calculator 5 calculates a common target brake force for a vehicle or carriage driven by a main electric motor, and calculates a common target brake force for a vehicle or carriage not driven by a main electric motor. The target brake force calculator 5 sends the target brake force of a vehicle or carriage driven by a main electric motor to the control pattern generator 6.

The speed detector 7 detects the speed of the vehicle, and transmits the detected speed to the control pattern generator 6. The speed detector 7 detects the vehicle speed based on, for example, an angular velocity detected by an angular velocity sensor attached to an axle that interconnects the left and right wheels. In addition, the speed detector 7 may also detect the vehicle speed using an angular velocity detected based on a pulse output from a pulse generator attached to an axle, or use speed information transmitted from other onboard equipment, such as an automatic train control (ATC) device.

Based on the target brake force and the speed of the vehicle, the control pattern generator 6 generates a common control pattern to be used for control of each of the electric power converters 8a and 8b, and sends the generated common control pattern to the electric power converters 8a and 8b. A control pattern is a torque command for the electric power converters 8a and 8b, for example. Based on the common control pattern, the electric power converter 8a controls the main electric motor 20a so that the output torque of the main electric motor 20a matches the torque command included in the common control pattern. Based on the common control pattern, the electric power converter 8b controls the main electric motor 20b so that the output torque of the main electric motor 20b matches the torque command included in the common control pattern.

The main electric motors 20a and 20b are controlled by a control pattern output from the control pattern generator 6. During power running, the main electric motors 20a and 20b induce wheel rotation, whereas during braking, the main electric motors 20a and 20b operate as electric generators to thereby apply electric brake force to the wheels and inhibit rotation of the wheels. The means for electric brakes may be rheostatic brakes or regenerative brakes.

The electric brake force calculator 10 calculates an electric brake force generated by the operation of the main electric motors 20a and 20b respectively controlled by the electric power converters 8a and 8b. For example, based on currents respectively detected by the current detectors 9a and 9b, the currents being output from the electric power converters 8a and 8b, the electric brake force calculator 10 calculates an electric brake force generated by the operation of the main electric motors 20a and 20b, and sends the calculated electric brake force to the supplementer 11.

Based on the electric brake force and the target brake force, the supplementer 11 calculates a brake force command value for the mechanical brakes 21a and 21b that inhibit rotation of the wheels, and sends the calculated brake force command value to the mechanical brakes 21a and 21b. The mechanical brakes 21a and 21b inhibit, in accordance with the brake force command value, the rotation of the wheels by using air pressure or hydraulic pressure to push a brake shoe against the tread of the wheel, or push a pad against a brake disc.

Figure 2:
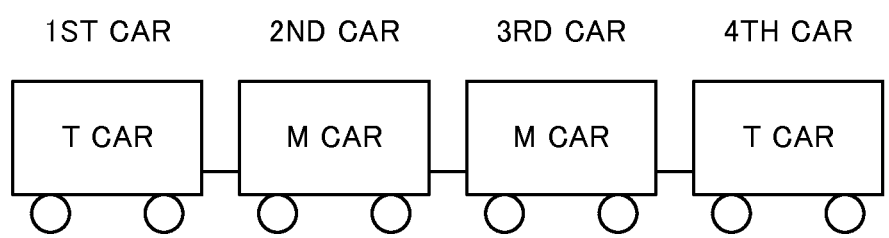
FIG. 2 is a diagram illustrating an example formation of vehicles provided with a brake control device according to the embodiment.

FIG. 2 is a diagram illustrating an example formation of vehicles provided with a brake control device according to the embodiment. In the example of FIG. 2, the 2nd and 3rd cars are M cars (motor coaches) each driven by a main electric motor, whereas the 1st and 4th cars are T cars (trailer coaches) not driven by any main electric motors. Provided that W1 is the load on the 1st car, W2 is the load on the 2nd car, W3 is the load on the 3rd car, W4 is the load on the 4th car, and "a" is the deceleration included in the brake command value, the required brake force for each vehicle becomes a·W1 for the 1st car, a·W2 for the 2nd car, a·W3 for the 3rd car, and a·W4 for the 4th car. The load is the product of the mass and gravitational acceleration. In the case of measuring load in units so that the measured value of the load matches the mass, the required brake force may be defined by the product of the deceleration and the load as above.

The target brake force calculator 5 distributes the total required brake force to the M cars and the T cars based on a predetermined ratio. As an example herein, it is supposed that D1 is the total brake force that the M cars are responsible for, while D2 is the total brake force that the T cars are responsible for. The target brake force calculator 5 distributes the total brake force D1 that the M cars are responsible for equally to each of the M cars, distributes the total brake force D2 that T cars are responsible for equally to each of the T cars, and calculates a common target brake force for the M cars and calculates a common target brake force for the T cars. Since there are two M cars, the target brake force calculator 5 sets the common target brake force for the M cars to D1 divided by the number of M cars, or D1/2. Also, since there are two T cars, the target brake force calculator 5 calculates the common target brake force for the T cars as D2 divided by the number of T cars, or D2/2.

In the M cars, if the electric brake force of each vehicle is less than D1/2, the value obtained by subtracting the electric brake of each vehicle from D1/2 is covered by the mechanical brakes. Also, in the T cars, the target brake force D2/2 is covered by the mechanical brake of each vehicle. Note that $D1+D2=a \cdot W1+a \cdot W2+a \cdot W3+a \cdot W4$. The distribution ratio of D1 and D2 is a design specification. For example, depending on the vehicle speed, D1 may be configured to be greater than D2 to get the most out of the electric brake force.

Figure 3:
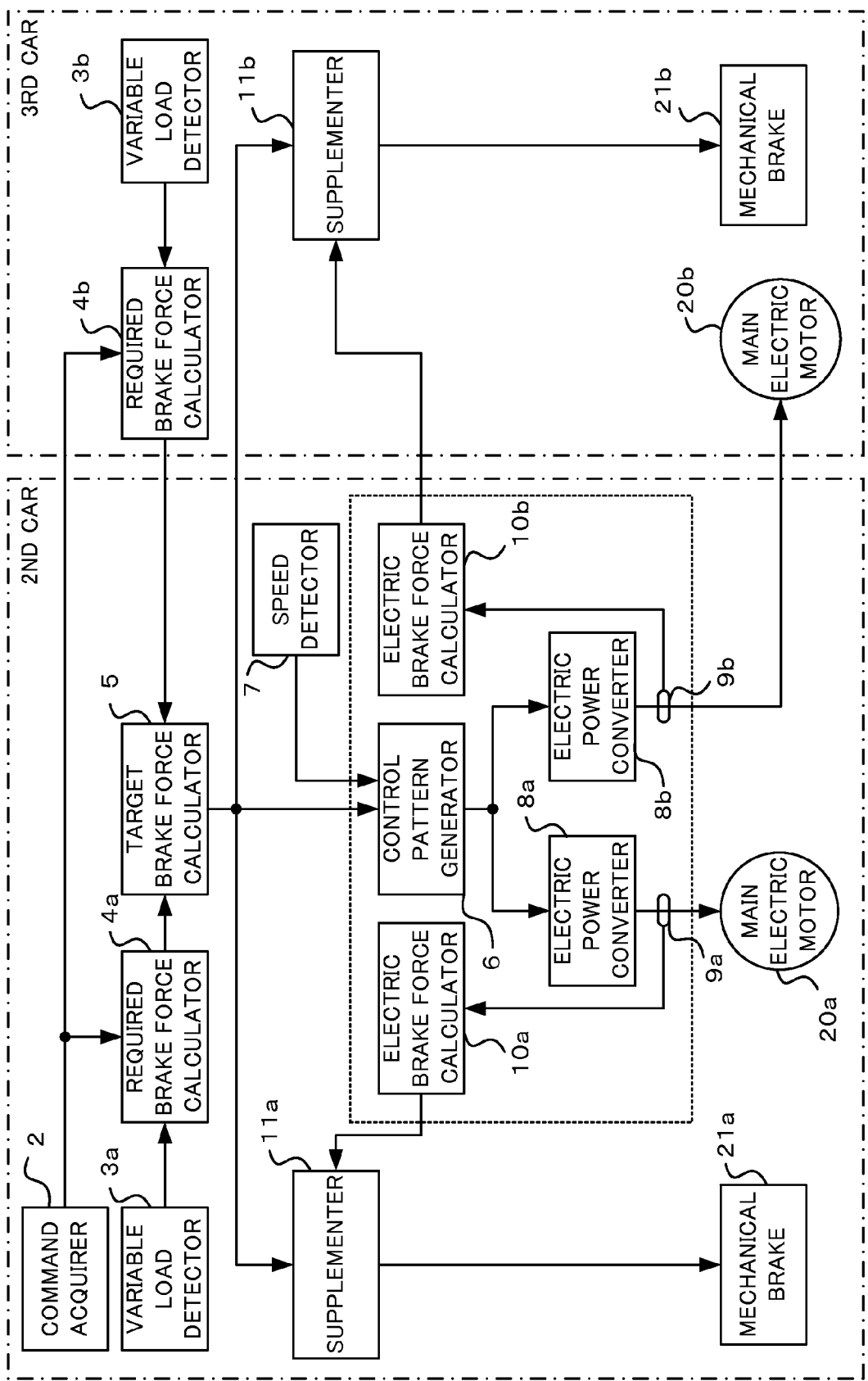
FIG. 3 is a block diagram illustrating an example arrangement of a brake control device according to the embodiment.

FIG. 3 is a block diagram illustrating an example of arrangement of a brake control device according to the embodiment. The operation of each component of the brake control device 1 disposed in the M cars of FIG. 2 will be described. The areas enclosed by the one-dot chain lines represent each vehicle, with each component of the brake control device 1, the main electric motors 20*a* and 20*b*, and the mechanical brakes 21*a* and 21*b* disposed in each of the 2nd car and the 3rd car of the electric car, respectively.

The command acquirer 2 acquires a brake command that includes a deceleration, and sends the acquired brake command to the required brake force calculators 4*a* and 4*b*. The variable load detector 3*a* calculates the load on the 2nd car, and sends the calculated load to the required brake force calculator 4*a*. The required brake force calculator 4*a* calculates the required brake force of the 2nd car based on the load on the 2nd car and the brake command, and sends the calculated required brake force to the target brake force calculator 5. The variable load detector 3*b* detects the load on the 3rd car, and sends the detected load to the required brake force calculator 4*b*. The required brake force calculator 4*b* calculates the required brake force of the 3rd car based on the load on the 3rd car and the brake command, and sends the calculated required brake force to the target brake force calculator 5.

Similarly to the example of FIG. 2, the required brake force calculator 4*a* calculates the required brake force of the 2nd car as $a \cdot W2$, while the required brake force calculator 4*b* calculates the required brake force of the 3rd car as $a \cdot W3$, for example.

The target brake force calculator 5 calculates a target brake force based on the required brake force of each vehicle, and sends the calculated target brake force to the control pattern generator 6 and to the supplementers 11*a* and 11*b*. Similarly to the example of FIG. 2, the target brake force calculator 5 takes D1 to be the brake force that the M cars are responsible for among the total required brake force for each vehicle, and calculates D1/2 as the common target brake force for the 2nd and 3rd cars. The speed detector 7 detects the vehicle speed using an angular velocity detected based on a pulse output from a pulse generator attached to an axle of the 2nd car, for example, and sends the detected vehicle speed to the control pattern generator 6.

The control pattern generator 6 generates a common control pattern for use in control of the main electric motors based on the target brake force of the 2nd and 3rd cars as well as the speed of the vehicle, and sends the generated common control pattern to the electric power converters 8*a* and 8*b*. The common control pattern is a torque command value for controlling the main electric motors 20*a* and 20*b* so that the electric brake force generated by the operation of each of the main electric motors 20*a* and 20*b* controlled by the common control pattern becomes less than or equal to the target brake force. Depending on the speed of the vehicle, the upper limit of the electric brake force generated by the operation of the main electric motors changes. The electric power converter 8*a* controls the main electric motor 20*a* of the 2nd car based on the common control pattern. The electric power converter 8*b* controls the main electric motor 20*b* of the 3rd car based on the common control pattern. The main electric motor 20*a* causes the wheels of the 2nd car to rotate during power running, and inhibits the rotation of the wheels of the 2nd car during braking. Likewise, the main electric motor 20*b* causes the wheels of the 3rd car to rotate during power running, and inhibits the rotation of the wheels of the 3rd car during braking.

Based on a current detected by the current detector 9*a*, the current being output from the electric power converter 8*a*, the electric brake force calculator 10*a* calculates an electric brake force generated by the operation of the main electric motor 20*a* of the 2nd car controlled by the electric power converter 8*a*, and sends the calculated electric brake force to the supplementer 11*a*. Based on a current detected by the current detector 9*b*, the current being output from the electric power converter 8*b*, the electric brake force calculator 10*b* calculates an electric brake force generated by the operation of the main electric motor 20*b* of the 3rd car controlled by the electric power converter 8*b*, and sends the calculated electric brake force to the supplementer 11*b*. Note if the electric power converter 8*a* controls multiple electric motors, for example, the electric brake force calculator 10*a* calculates the total electric brake force generated by the operation of the multiple electric motors controlled by the electric power converter 8*a*.

Based on the electric brake force calculated based on the current output from the electric power converter 8*a*, and the target brake force of the 2nd car, if the electric brake force falls below the target brake force, the supplementer 11*a* calculates the air supplement control amount that is the difference between the electric brake force and the target brake force as a brake force command value. The supplementer 11*a* sends the brake force command value to the mechanical brake 21*a*. The mechanical brake 21*a* inhibits the rotation of the wheels of the 2nd car in accordance with the brake force command value.

Based on the electric brake force calculated based on the current output from the electric power converter 8*b*, and the target brake force of the 3rd car, if the electric brake force falls below the target brake force, the supplementer 11*b* calculates the air supplement control amount that is the difference between the electric brake force and the target brake force as a brake force command value. The supplementer 11*b* sends the brake force command value to the mechanical brake 21*b*. The mechanical brake 21*b* inhibits the rotation of the wheels of the 3rd car in accordance with the brake force command value.

Note that if the electric power converter 8*a* controls multiple electric motors, for example, the supplementer 11*a* calculates the air supplement control amount based on the target brake force of the vehicle or carriage provided with the wheels whose rotation is to be inhibited by the multiple electric motors, as well as the total electric brake force generated by the operation of the multiple electric motors controlled by the electric power converter 8*a*. Also, if the electric brake force is equal to or greater than the target brake force, the supplementers 11a and 11b do not calculate a brake force command value.

Figure 4:
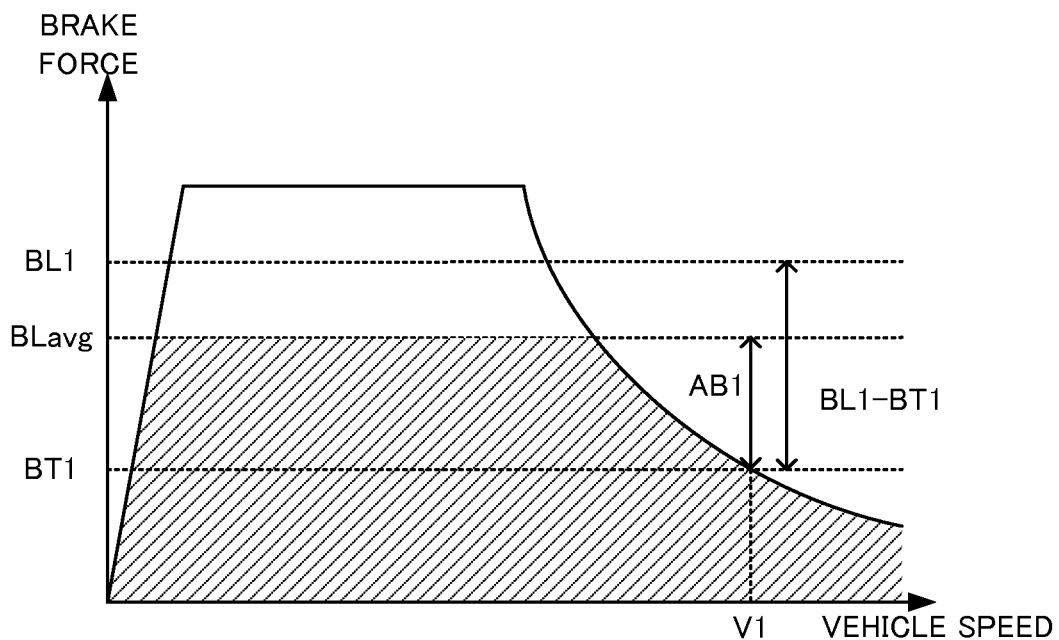
FIG. 4 is a diagram illustrating an electric brake force and an air supplement control amount.
Figure 5:
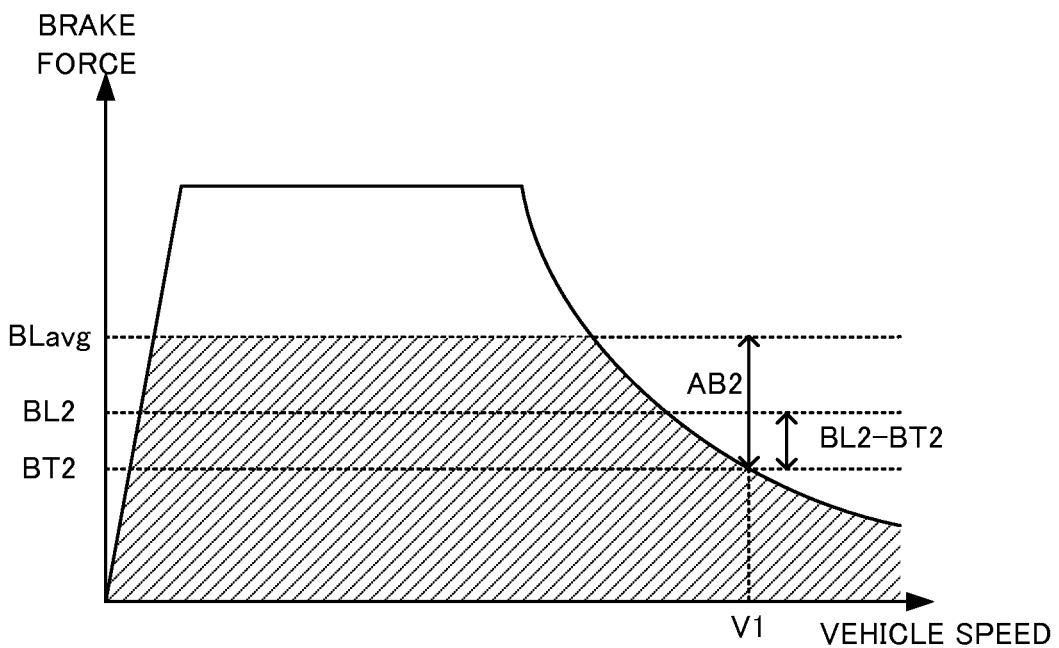
FIG. 5 is a diagram illustrating the electric brake force and the air supplement control amount.

FIGS. 4 and 5 are diagrams illustrating the electric brake force and the air supplement control amount. The horizontal axis is the vehicle speed, while the vertical axis is the brake force. FIG. 4 is a diagram that illustrates the electric brake force and the air supplement control amount for the 2nd car, while FIG. 5 is a diagram that illustrates the electric brake force and the air supplement control for the 3rd car. The graphs plotted with a solid line represent the upper limit of the electric brake force that may be output by each of the main electric motors 20a and 20b. The upper limit of the electric brake force changes according to the vehicle speed, with the upper limit of the electric brake force becoming lower as the vehicle speed becomes faster. The shaded part is the electric brake force generated by the operation of the main electric motors 20a and 20b.

It is supposed that BL1 is the required brake force of the 2nd car, and that BL2 is the required brake force of the 3rd car. If the loads on the 2nd car and the 3rd car are different, a difference is generated between the required brake force BL1 of the 2nd car and the required brake force BL2 of the 3rd car as illustrated in FIGS. 4 and 5. It is supposed that, for the case in which the vehicle speed is V1, BT1 is the electric brake force generated by the operation of the main electric motor 20a of the 2nd car, and BT2 is the electric brake force generated by the operation of the main electric motor 20b of the 3rd car. When the vehicle speed is V1, the electric brake force falls below the required brake force in either the 2nd car or the 3rd car. If BL1–BT1 is covered by an air brake in the 2nd car and BL2–BT2 is covered by an air brake in the 3rd car, a problem occurs in that the degree of wear differs between the vehicles, and the maintenance cycles differ between the vehicles.

On the other hand, with the brake control device 1 according to the embodiment, a target brake force BLavg is used. The target brake force BLavg is D1/2 in the example of FIG. 2. When the vehicle speed is V1, BT1 falls below BLavg, and thus the air supplement control amount in the 2nd car is BLavg–BT1. Similarly, when the vehicle speed is V1, BT2 falls below BLavg, and thus the air supplement control amount in the 3rd car is BLavg–BT2. In other words, when the vehicle speed is V1, the brake force command value AB1 output from the supplementer 11a is BLavg–BT1, while the brake force command value AB2 output from the supplementer 11b is BLavg–BT2.

Since the main electric motors 20a and 20b used in each vehicle have nearly the same properties, the electric brake forces BT1 and BT2 generated by the operation of the main electric motors 20a and 20b controlled by a common control pattern are nearly equal. Since the brake force exerted by the mechanical brake 21a in the 2nd car and the brake force exerted by the mechanical brake 21b in the 3rd car are nearly equal, the degree of wear on the mechanical brakes 21a and 21b may be treated as being equal. Even if there is a difference between the loads on the 2nd car and the 3rd car, by using the mechanical brakes 21a and 21b to cover the difference between the electric brake force and a common target brake force calculated from the required brake force for each vehicle, it becomes possible to equalize the degree of wear, and improve the serviceability of the vehicle.

If the control pattern differs for every electric power converter, it is necessary to provide an equal number of control pattern generators 6 for the electric power converters 8a and 8b, but in this embodiment, a common control pattern is used, and thus one control pattern generator 6 is sufficient.

Also, unlike a case in which information about the load for every vehicle or carriage is sent to a propulsion control device via respective signal lines from each vehicle or carriage, in this embodiment, a target brake force is sent from the target brake force calculator 5 to the propulsion control device. For this reason, simplifying the structure of the propulsion control device becomes possible, and reducing manufacturing costs becomes possible.

Figure 6:
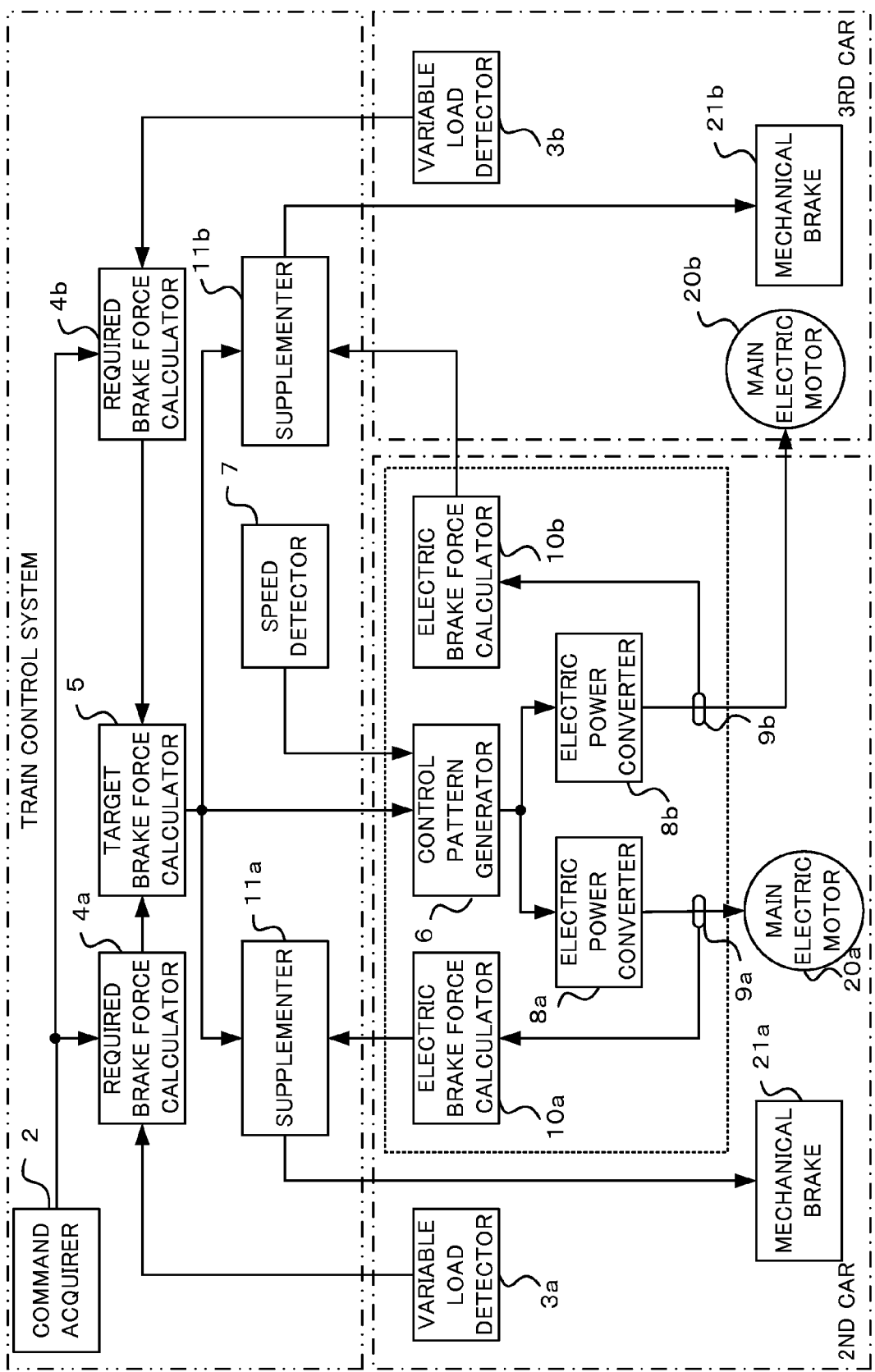
FIG. 6 is a block diagram illustrating a different example arrangement of the brake control device according to the embodiment.

FIG. 6 is a block diagram illustrating a different example of arrangement of the brake control device according to the embodiment. Part of the brake control device 1 is built-in as a function of a train control system indicated by the two-dot chain lines in FIG. 6. The train control system may be installed in an arbitrary location of the electric car. The functions built into the train control system are not limited to the example of FIG. 6.

In another possible configuration, the target brake force calculator 5 is not provided, the required brake force calculators 4a and 4b transmit and receive calculated required brake forces with each other, and each of the required brake force calculators 4a and 4b calculate and send a target brake force to the control pattern generator 6 and the supplementers 11a and 11b. Also, instead of the current detectors 9a and 9b, torque sensors may be provided to detect the torque of the main electric motors 20a and 20b, and the electric brake force calculators 10a and 10b may be configured to calculate the electric brake force based on the torque of the main electric motors 20a and 20b.

The electric power converters 8a and 8b may control an arbitrary number of main electric motors. The example in FIG. 1 supposes that the electric power converter 8a controls two main electric motors disposed in different carriages, for example. In this case, the target brake force calculator 5 calculates a common target brake force for the carriages driven by the main electric motors. Also, based on a current supplied to each of the above two main electric motors, or the torque of each of the main electric motors, the electric brake force calculator 10 may be configured to calculate the electric brake force of each of the above two main electric motors, and the supplementer 11 may be configured to calculate an air supplement control amount based on the electric brake force of each of the above two main electric motors and a common target brake force for each carriage. By using a common target brake force for every carriage, it becomes possible to equalize the degree of wear on the mechanical brakes of the carriages.

Additionally, it is supposed that one of the main electric motors or electric power converters fails. In this case, in the carriage in which a normally functioning main electric motor and electric power converter are disposed, brake control is conducted by the electric brake force and the brake force of the mechanical brakes which are applied as needed, as discussed above. On the other hand, in the carriage in which the failed main electric motor or electric power converter is disposed, the insufficient electric brake force due to the failure of the main electric motor or electric power converter is further supplemented by the mechanical brake of the carriage. By determining an air supplement control amount based on the electric brake force for each main electric motor, the degree of wear on the mechanical brake of each carriage may be equalized during normal operation, whereas during abnormal operation, such as a failure of a main electric motor or an electric power converter, it becomes possible for other main electric motors to remain unaffected by the abnormality.

Figure 7:
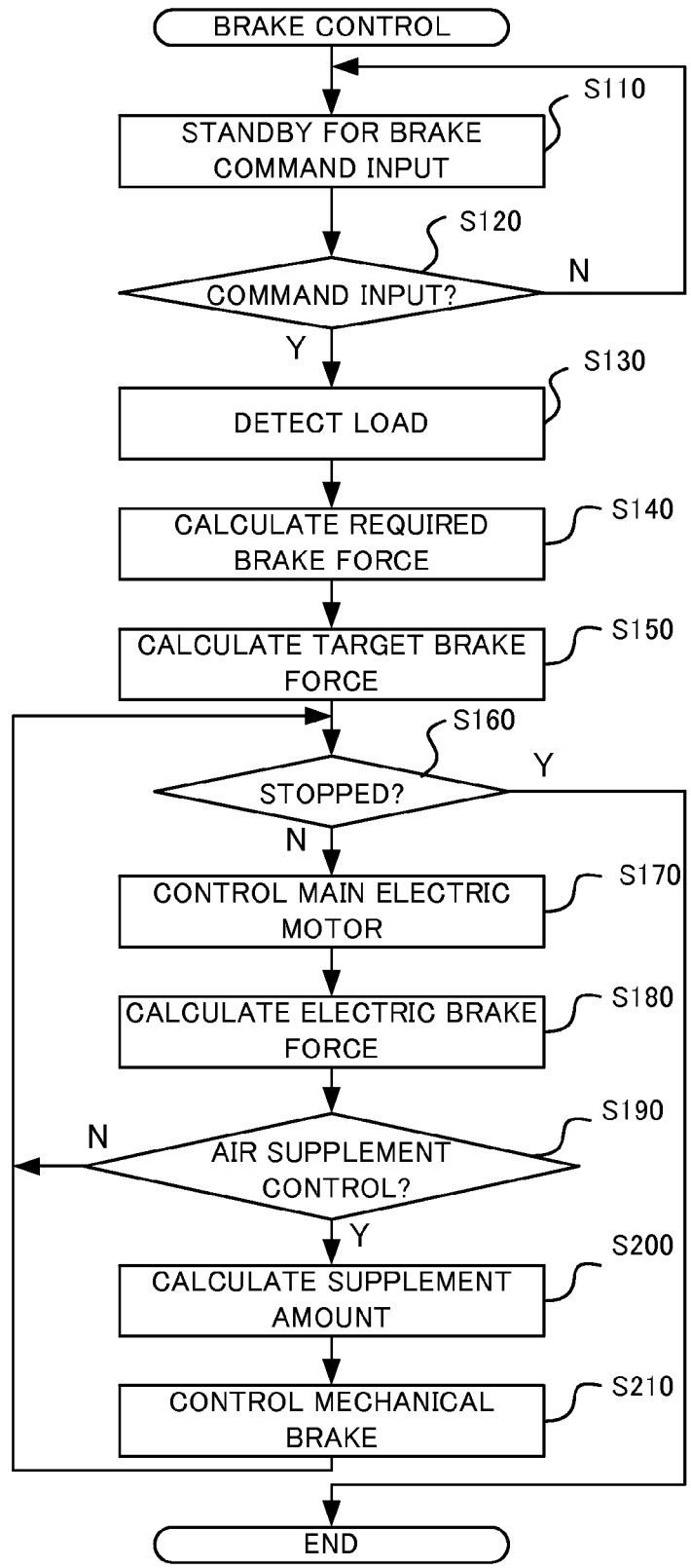
FIG. 7 is a flowchart illustrating an example of brake control operations conducted by the brake control device according to the embodiment.

FIG. 7 is a flowchart illustrating an example of brake control operations conducted by the brake control device according to the embodiment. Brake control operations conducted by the brake control device 1 illustrated in FIG. 1 will be described. The command acquirer 2 stands by for input of a brake command including a deceleration (step S110). If a brake command is not input (step S120; N), the process returns to step S110. If a brake command is input (step S120; Y), the variable load detector 3 detects the load on a vehicle, or a carriage attached to a vehicle, that constitutes the electric car (step S130).

The required brake force calculator 4 calculates the required brake force for every vehicle or carriage, based on the load on the vehicle or carriage and the brake command (step S140). Based on the required brake force calculated for each vehicle or carriage, the target brake force calculator 5 calculates a common target brake force for each vehicle or carriage driven by a main electric motor, and for each vehicle or carriage not driven by a main electric motor (step S150). The speed detector 7 detects the speed of the vehicle, and if the vehicle is stopped (step S160; Y), the process ends. If the vehicle is not stopped (step S160; N), the control pattern generator 6 generates a common control pattern based on the target brake force of the vehicle or carriage driven by a main electric motor as well as the speed of the vehicle, and the electric power converters 8a and 8b respectively control the main electric motors 20a and 20b so that the output torque of the main electric motors 20a and 20b matches the torque command given by the common control pattern (step S170).

The electric brake force calculator 10 calculates an electric brake force generated by the operation of the main electric motors 20a and 20b respectively controlled by the electric power converters 8a and 8b (step S180). If the electric brake force is equal to or greater than the target brake force, air supplement control by the supplementer 11 is not needed (step S190; N), and thus the process returns to step S160, and the above process is repeated. If the electric brake force is less than the target brake force, air supplement control is needed (step S190; Y), and thus the supplementer 11 calculates the air supplement control amount that is the difference between the electric brake force and the target brake force as a brake force command value (step S200). When an air supplement control amount is generated, the supplementer 11 outputs a control signal to the mechanical brakes 21a and 21b based on the brake force command value for the mechanical brakes 21a and 21b that inhibit the rotation of the wheels (step S210). After the processing in step S210 completes, the process returns to step S160, and the above process is repeated.

As described above, according to a brake control device 1 in accordance with the embodiment, it becomes possible to decrease fluctuations in the wear loss of mechanical brakes in an electric car that implements both electric brakes and mechanical brakes.

Particularly, in the case of a train provided with multiple main electric motors in which all vehicles are M cars each driven by a main electric motor, the target brake force becomes the average value of the required brake force for each vehicle, and by driving the main electric motors according to a common control pattern, it becomes possible to equalize the electric brake force of each vehicle, and decrease fluctuations in the wear loss of the mechanical brakes of each vehicle. Also, even for a train with a mixed formation of M cars and T cars, it becomes possible to decrease fluctuations in the wear loss of the mechanical brakes on the M cars and fluctuations in the wear loss of the mechanical brakes on the T cars, irrespectively of the brake force partition ratio between the M cars and the T cars. Also, by determining a brake force partition ratio between the M cars and T cars and determining D1 and D2 so that the remainder after subtracting the electric brake force that may be generated by the M cars from the total required brake force is equally distributed among the mechanical brakes of each vehicle, it becomes possible to decrease fluctuations in the wear loss of the mechanical brakes of each vehicle.

In the foregoing embodiments, various modifications are possible within the scope of the spirit of the present disclosure. The foregoing embodiments are for the purpose of describing the present disclosure, and are not intended to limit the scope of the present disclosure. The scope of the present disclosure is indicated by the attached claims rather than the embodiments. Various modifications made within the scope of the claims and their equivalents are to be included in the scope of the present disclosure.

INDUSTRIAL APPLICABILITY

The present disclosure may be suitably adopted in a brake control device of an electric car that implements both electric brakes and mechanical brakes.

REFERENCE SIGNS LIST 1 brake control device
2 command acquirer
3, 3a, 3b variable load detector
4, 4a, 4b required brake force calculator
5 target brake force calculator
6 control pattern generator
7 speed detector
8a, 8b electric power converter
9a, 9b current detector
10, 10a, 10b electric brake force calculator
11, 11a, 11b supplementer
20a, 20b main electric motor
21a, 21b mechanical brake

The invention claimed is:
1. A brake control device comprising:
an electric power converter to control a main electric motor inducing wheel rotation;
a variable load detector to detect a load on each of a plurality of vehicles that are coupled to each other or each of a plurality of carriages attached to the vehicles;
a command acquirer to acquire a brake command that includes a deceleration of the vehicles;
a speed detector to detect a speed of the vehicles;
a required brake force calculator to calculate a required brake force for each of the plurality of vehicles or each of the carriages, based on the load on each of the vehicles or each of the carriages and the brake command;
a target brake force calculator to calculate, based on the required brake force calculated for each of the vehicles or each of the carriages, a target brake force that is common for each of the vehicles or each of the carriages driven by the main electric motor, and a target brake force that is common for each of the vehicles or each of the carriages not driven by the main electric motor;
a control pattern generator to generate a common control pattern for use in control of the main electric motor, based on the target brake force that is common for each of the vehicles or each of the carriages driven by the main electric motor and the speed of the vehicles;

an electric brake force calculator to calculate an electric brake force generated by operation of the main electric motor controlled according to the control pattern; and a supplementer to calculate a brake force command value based on the electric brake force and the target brake force, and send the brake force command value to a mechanical brake that inhibits wheel rotation.

2. The brake control device according to claim 1, wherein
for the vehicles or the carriages driven by the main electric motor, based on the electric brake force of each of the electric power converter and the target brake force of the vehicles or the carriages driven by the main electric motor controlled by the electric power converter, if the electric brake force falls below the target brake force, the supplementer sends a difference between the electric brake force and the target brake force as the brake force command value to the mechanical brake that inhibits rotation of wheels attached to the vehicles or the carriages, and for the vehicles or the carriages not driven by the main electric motor, the supplementer sends the target brake force of the vehicles or the carriages as the brake force command value to the mechanical brake that inhibits rotation of wheels attached to the vehicles or the carriages.

3. The brake control device according to claim 1, wherein
for the vehicles or the carriages driven by the main electric motor, based on the electric brake force of each of the main electric motor and the target brake force of the vehicles or the carriages driven by the main electric motor, if the electric brake force falls below the target brake force, the supplementer sends a difference between the electric brake force and the target brake force as the brake force command value to the mechanical brake that inhibits rotation of wheels attached to the vehicles or the carriages, and for the vehicles or the carriages not driven by the main electric motor, the supplementer sends the target brake force of the vehicles or the carriages as the brake force command value to the mechanical brake that inhibits rotation of wheels attached to the vehicles or the carriages.

4. A brake control method conducted by a brake control device provided with an electric power converter that controls a main electric motor inducing wheel rotation, the brake control method, comprising:

detecting a load on each of a plurality of vehicles or each of a plurality of carriages attached to the vehicles;

acquiring a brake command that includes a deceleration of the vehicles;

detecting a speed of the vehicles;

calculating a required brake force for each of the vehicles or each of the carriages, based on the load on each of the vehicles or each of the carriages and the brake command;

based on the required brake force calculated for each of the vehicles or each of the carriages, calculating a target brake force that is common for each of the vehicles or the carriages driven by the main electric motor, and calculating a target brake force that is common for each of the vehicles or the carriages not driven by the main electric motor;

generating a common control pattern for use in control of the main electric motor, based on the target brake force that is common for each of the vehicles or the carriages driven by the main electric motor and the speed of the vehicle;

calculating an electric brake force generated by operation of the main electric motor controlled according to the control pattern; and calculating a brake force command value based on the electric brake force and the target brake force, and sending the brake force command value to a mechanical brake that inhibits wheel rotation.

5. The brake control method according to claim 4, wherein
for the vehicles or the carriages driven by the main electric motor, based on the electric brake force of each of the electric power converter and the target brake force of the vehicles or the carriages driven by the main electric motor controlled by the electric power converter, if the electric brake force falls below the target brake force, a difference between the electric brake force and the target brake force is sent as the brake force command value to the mechanical brake that inhibits rotation of wheels attached to the vehicles or the carriages, and for the vehicles or the carriages not driven by the main electric motor, the target brake force of the vehicles or the carriages is sent as the brake force command value to a mechanical brake that inhibits rotation of wheels attached to the vehicles or the carriages.

6. The brake control method according to claim 4, wherein
for the vehicles or the carriages driven by the main electric motor, based on the electric brake force of each of the main electric motor and the target brake force of the vehicles or the carriages driven by the main electric motor, if the electric brake force falls below the target brake force, a difference between the electric brake force and the target brake force is sent as the brake force command value to the mechanical brake that inhibits rotation of wheels attached to the vehicles or the carriages, and for the vehicles or the carriages not driven by the main electric motor, the target brake force of the vehicle or the carriage is sent as the brake force command value to a mechanical brake that inhibits rotation of wheels attached to the vehicles or the carriages.

* * * * *